Dec. 6, 1966  J. BURNHAM  3,290,561
CAPACITOR ELECTROLYTE
Filed Aug. 26, 1963
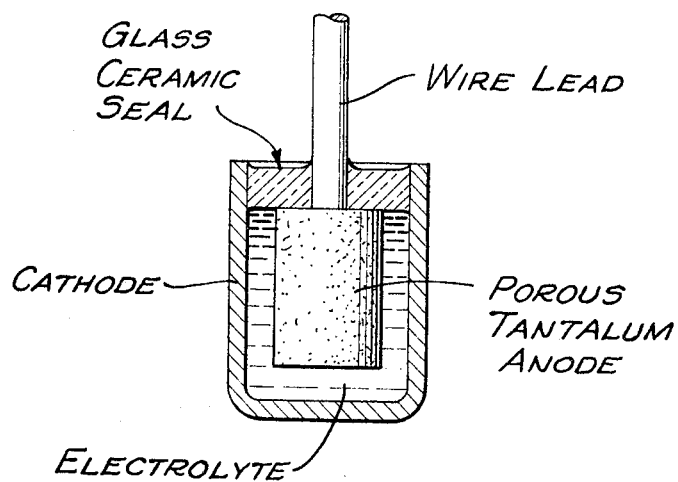
INVENTOR.
JOHN BURNHAM
BY
EDWARD D. O'BRIAN
ATTORNEY United States Patent Office 3,290,561
Patented Dec. 6, 1966

3,290,561
CAPACITOR ELECTROLYTE
John Burnham, 10960 Verano Road, Los Angeles, Calif.
Filed Aug. 26, 1963, Ser. No. 304,330
13 Claims. (Cl. 317—230)

This application is a continuation-in-part of application, Serial No. 697,159, filed November 18, 1957, now Patent No. 3,120,695.

This application relates to the field of electrolytic capacitors. More specifically it relates to a new electrolyte for use with electrolytic capacitors, and to tantalum electrolytic capacitors containing this electrolyte.

In order to understand the present invention and many advantages of it, it is considered necessary to set forth certain of the history of the field of electrolytic capacitors. Immediately prior to the past decade practically all commercial electrolytic capacitors were manufactured utilizing an aluminum anode covered with an aluminum oxide dielectric film, this anode being immersed in an electrolyte in which there was also immersed another electrode. Units of this type utilizing the valve metal aluminum are commercially made to be used at voltages up to about 500 volts. With them comparatively weak electrolytes such as are formed by dissolving boric acid or various borates in polyhydric alcohols serving as solvents are commercially employed. Such electrolytes tend to decompose, as when an aluminum electrolytic capacitor is used at an elevated temperature, so as to produce gas. In addition, the conductivity of such electrolytes is not considered satisfactory at comparatively low temperatures.

Today tantalum electrolytic capacitors are being employed instead of aluminum electrolytics for many applications for several reasons. One is the size advantage. Tantalum units having a given capacitance rating can be manufactured so as to be smaller than aluminum electrolytic capacitors having the same rating. Another reason for the increased use of tantalum electrolytic capacitors relates to their advantageous low temperature characteristics. These characteristics are directly related to the types of electrolytes which may be employed in these capacitors.

Because of the fact that tantalum is more resistant to chemical corrosion than aluminum, stronger electrolytes may be employed in tantalum electrolytic capacitors than may be employed with aluminum units. Mineral acids such as sulphuric acid and concentrated aqueous solutions of salts such as lithium chloride possess relatively high conductivity as they are almost completely dissociated and, hence, may be termed "srtong" electrolytes. Such aqueous electrolytes are conductive at comparatively low temperatures, and are presently used in tantalum electrolytic capacitors. The presence of $H_2O$ in such electrolytes limits their use at elevated temperatures due to the high rate of vaporization of water near and above the boiling point of such electrolytes.

The number of electrolytes which can be employed in tantalum electrolytic capacitors is not unlimited. Many aqueous electrolytes such as solutions of strong bases or salts of strong bases and weak acids are not suitable since during use they will corrode the anode. In general, it may be stated that prior electrolytes employing non-aqueous solvents are not suited for use with tantalum electrolytic capacitors having wide range of operating temperatures because of any of several reasons. Frequently, salts are not sufficiently soluble in these non-aqueous solvents in order to provide the conductivity required. In many cases these non-aqueous solvents enter into undesired reactions with the solutes employed.

In order to provide tantalum electrolytic capacitors capable of being used over a wide range of temperatures, efforts have been made to develop electrolytes based upon eutectic or similar mixtures. In general electrolytes of this type have not proved satisfactory since tantalum electrolytic capacitors in which they are used do not have the desired electrical performance characteristics. At the present time simple aqueous electrolytes are usually employed with tantalum electrolytic capacitors, since best results are achieved with them.

The use of tantalum capacitors is definitely limited by these electrolytes. At the present time common tantalum electrolytic capacitors of the so-called foil type are limited to use at voltages of up to about 150 volts; those of the common sintered, porous pellet type are limited to use at voltages of up to about 125 volts because of the breakdown or sparking limitations of sulphuric acid electrolytes employed in them. When concentrated aqueous solutions of lithium chloride are employed as electrolytes in tantalum electrolytic capacitors, these units have a limiting voltage rating of approximately 70 volts due to sparking of the electrolyte. The values given here are primarily employed for comparative purposes; those familiar with this field will recognize that these are not exact values.

When an electrolytic capacitor is operated at 500 volts or higher, a voltage scintillation will take place, destroying part of the oxide film on the anode necessary to the operation of the unit. Within tantalum electrolytic capacitors this damage cannot be repaired as easily as with aluminum, and it results in the leakage current between the electrodes increasing. Even in an undamaged electrolytic capacitor using an aluminum or a tantalum anode some leakage current will flow between the electrodes. Any part of such leakage current flowing through electrolytes of the types previously employed in tantalum electrolytic capacitors will cause such electrolytes to dissociate, forming gas.

The problem of gas formation within any electrolytic capacitor is a serious one. If gas accumulates within any hermetically sealed capacitor, in time the capacitor will break, allowing the electrolyte to escape and allowing contaminants to enter the unit. The strong electrolytes employed in tantalum electrolytic capacitors will normally cause serious corrosion damage if leakage occurs. Experience has proved that various types of vents designed to permit the escape of gas are not completely satisfactory for use in electrolytic capacitors because such vents are subject to leakage. At the present time hermetically sealed units are desired for the majority of applications.

A basic object of this invention is to provide new and improved electrolytic capacitors utilizing a specific type of electrolyte as herein defined. A related object of the invention is to teach the composition of a new and improved electrolyte for use in electrolytic capacitors.

All of these formal objects of this invention are aimed at certain specific desired results. One of these objects is to provide tantalum electrolytic capacitors having higher voltage ratings than previously possible. Another is to provide tantalum electrolytic capacitors capable of being employed or used over a greater range of operating temperatures than previously possible. A further object is to provide an electrolyte which will not form gas within an electrolytic capacitor by electrolysis of the electrolyte. A still further object is to provide electrolytic capacitors having comparatively low leakage currents.

All of these objectives or results achieved with this invention are interrelated, and those skilled in the field to which the entire concept of this invention pertains will realize that they may be stated in several different manners. As an aid to understanding the invention, the invention itself can similarly be briefly summarized in several ways. It concerns tantalum electrolytic capacitors which are formed by first anodizing tantalum anodes, then polarizing these anodes, and then assembling them in electrolytic capacitors using a novel type of electrolyte as herein described. This type of electrolyte contains at least one heterocyclic compound and at least one aliphatic acid or aliphatic acid anhydride. Obviously various equivalent derivatives of such compounds can be employed. As hereinafter indicated, such electrolytes may either be of a viscous nature or may be liquid.

In order to aid in understanding the invention, there is shown in the accompanying drawing:

A side elevational view, partially in section, of a tantalum electrolytic capacitor of the present invention.

For convenience, the various parts of this drawing are designated by their common names instead of numerals since comparatively few parts are involved in this electrolytic capacitor. Those skilled in the art to which this invention pertains will realize that this invention is not restricted to any particular type of tantalum electrolytic capacitor construction. Thus, the teachings of this specification may be employed with electrolytic capacitors using etched or unetched foil or wire tantalum anodes, or sintered porous tantalum anodes. Various types of known cathodes and sealing means may similarly be employed with the invention.

In producing tantalum electrolytic capacitors having the characteristics indicated the anodes may be prepared in accordance with the disclosure of patent application Serial No. 697,159 filed November 18, 1957, of which this is a continuation-in-part. This application is now Patent No. 3,120,695 issued February 11, 1964, entitled "Electrolytic Capacitors."

Electrolytes of the type to which this invention pertains are formed by mixing together at least one aliphatic acid or acid anhydride or aryl halide derivative and at least one heterocyclic compound in which the heterocyclic atom is nitrogen so as to form a composition which is liquid or semi-liquid or viscous over the temperature range desired for the electrolytic capacitor being manufactured. For the present day specifications this temperature range is from −60° C. to +150° C.

It is not necessary that the individual ingredients of such an electrolyte be liquid or viscous over the entire operating temperature range desired. It is, however, important that the final composition be liquid or viscous over this range. At the present time it is believed that when the ingredients of an electrolyte of this invention are intermixed that a mixture is formed which has properties which are different from the properties of the individual ingredients. There is reason to believed that such a mixture may actually consist of certain organic complexes formed between the acidic and the heterocyclic ingredients employed. Satisfactory electrolytes have been created utilizing from about 10 to about 96 mole percent acidic ingredients and the balance heterocyclic ingredients.

These electrolytes can be formed using liquid aliphatic acids such as formic, acetic, propionic, butyric, valeric and heptoic or similar acids having up to the same number of carbon atoms having branched chains. Also, the alpha substituted halide derivatives of these acids such as alphachloracetic acid or the anhydrides of any of these acids can be employed. At least one of such acids or anhydrides must be employed with the invention; if desired a mixture of them can be utilized.

A large number of different heterocyclic compounds can be employed in the electrolytes of this invention. At least one of such compounds must be employed; if desired a mixture of them can be utilized. Suitable heterocyclic compounds having one or more six membered rings are pyridine, alpha-, beta-, or gamma-picoline, quinoline, isoquinoline lutidines such as 2,6 lutidine, etc.; some of these compounds are bicyclic, and, hence, include at least one six membered heterocyclic ring. Suitable compounds having five membered rings are pyrrole, indole, etc. Compounds such as thiazole containing other elements besides nitrogen and carbon in the ring structure are suitable for use within the invention. Compounds such as imidazole which contain several nitrogen atoms in the ring structure are also suitable provided these nitrogen atoms are not positioned immediately adjacent to one another within the ring structure.

Compounds such as are indicated in the preceding are primarily useful where it is desired to obtain an electrolyte of a liquid character. An important feature of the present invention lies in the discovery that various vinyl derivatives of such compounds, such as various vinyl pyridines, vinyl picolines, vinyl quinolines, pyrroles, indoles, etc. can be utilized to form satisfactory electrolytes of a viscous, semi-solid character. In forming electrolytes having these physical characteristics, the acidic ingredient or ingredients employed are mixed with a vinyl compound or a mixture of vinyl compounds and the mixture is polymerized so as to produce the final electrolyte desired. Such polymerization can be conveniently carried out using conventional vinyl polymerization catalysts such as hydrogen peroxide. With polymers such as are created by this procedure, the acidic ingredient or ingredients employed apparently exert a plasticising influence on the complete polymer created.

It may be stated that all of the heterocyclic compounds contain either a five- or six-membered ring in which nitrogen is a heterocyclic nitrogen atom located between two carbon atoms. Obviously the above listing of heterocyclic compounds is not to be taken as being complete. An extremely large number of equivalent compounds may be employed in which inert groups such as methyl, ethyl, propyl, or isopropyl groups are attached to the carbon atoms within the ring structure groups.

As a specific example of the invention, a porous tantalum anode was formed to 250 volts in a 10% aqueous solution of acetic acid. After being formed it was rinsed and was polarized until a constant leakage current was obtained in a 25% aqueous solution of sulphuric acid at 280 volts. The anode was then cleaned, dride, and then assembled in a complete capacitor utilizing a known type of inert cathode so that the anode and cathode were connected by an electrolyte containing 21.6 mole percent pyridine and 78.4 mole percent glacial acetic acid. This capacitor could be used at voltages above the polarizing voltages and could be operated over a range of temperatures of from about −60° C. to +150° C. In addition, it had extremely low leakage current, and when used over a prolonged period showed no tendency towards gas formation within the electrolyte.

The fact that electrolytes of the present invention do not form gas when used is considered to be extremely important with the instant invention. The precise mechanism of the electrode reactions involved using the electrolytes of this invention is not known. It is considered that current which flows through this electrolyte as a leakage current, is probably hole current or electronic current and that the ions which enter into the conduction of the electrolyte merely give up or add electrons at the electrodes. No evidence has been found of reactions producing gaseous products. It is to be emphasized that the above is given by way of theory only and the precise mechanism by which an electrolyte of this invention functions is not presently understood.

Those skilled in the art to which this invention pertains will realize that tantalum electrolytic capacitors formed as herein indicated differ from prior units in their performance characteristics inasmuch as they may be operated at voltage ratings substantially above the voltage ratings at which prior tantalum units as indicated in the iniinitial portion of this specification may be operated. Thus, with this invention tantalum electrolytic capacitors having a 300 volt or higher voltage rating may be created. In general it may be stated that any tantalum electrolytic capacitor formed as herein indicated will withstand 25%– 30% higher voltages than the voltages applied to the tantalum anodes during the polarization of these anodes as indicated in this specification. Obviously these percentages are approximate and are used to designate a socalled "overload" factor which may be considered in connection with the capacitors of this invention.

It is not considered necessary in this specification to set forth a long list of every possible electrolyte falling within the scope of this disclosure. Electrolytes containing 10 mole percent acetic acid and 90 mole percent pyridine may be satisfactorily created in the obvious manner. Similarly, electrolytes containing 96 mole percent glacial acetic acid and 4 mole percent pyridine may be created in this manner. Other similar electrolytes using the compounds indicated in the preceding discussion may be made by mixing these compounds within the ranges of proportions indicated. As an example of this an electrolyte of the present invention was formed using a commercial mixture of quinoline and isoquinoline containing about 90% by weight quinoline and about 10% by weight isoquinoline in the amount of 20% by weight and the remainder glacial acetic acid by mixing these two ingredients. A viscous, semi-solid electrolyte of this invention was created by mixing 20 mole percent acetic anhydride with 80 mole percent 4-vinyl pyridine and polymerizing this mixture by adding a 35% aqueous solution of hydrogen peroxide in the amount of 10% by weight of the mixutre.

A viscous, semi-solid electrolyte of the present invention can, of course, be similarly prepared using proportions of the various compounds indicated in the preceding with various other types of polymerization catalysts. All the ingredients of such electrolytes are preferably first mixed, and this mixture may then be located against the complete oxide surface of the anode employed so as to fill the space between the anode and the cathode employed. Then, this mixture can be polymerized in situ against a formed anode. In many cases it is considered preferable to employ an acid anhydride in an electrolyte of this invention since the acid anhydride used will react with any uncombined water present so as to produce an anhydrous mixture. Electrolytes as herein described may be employed with various types of electrolytic capacitors besides tantalum electrolytic units.

Because of the nature of this invention, and the fact that it has many aspects, this invention is to be considered as being limited only by the appended claims forming a part of this disclosure.

The subject matter of this specification is related to the subject matter of U.S. Patent No. 3,098,182, issued July 16, 1963, entitled "Electrolytic Capacitors."

I claim:

1. A electrolyte for use in electrolytic capacitors consisting essentially of a substantially non-gas forming mixture under operating conditions of at least one heterocyclic compound containing a nitrogen heterocyclic atom located between two carbon atoms, and a compound selected from a group consisting of aliphatic acids, alpha-halogen substituted aliphatic acids, and anhydrides thereof, said mixture being substantially free of film-forming components.

2. An electrolyte for use in electrolytic capacitors as defined in claim 1 wherein said electrolyte is liquid.

3. An electrolyte for use in electrolytic capacitors as defined in claim 1 wherein said heterocyclic compound of said mixture is a polymer.

4. An electrolyte for use in electrolytic capacitors consisting essentially of a substantially non-gas forming mixture under operating conditions from about 10 to about 96 mole percent of at least one acidic compound selected from the group consisting of aliphatic acids, alpha-halogen substituted aliphatic acids, and anhydrides thereof, the remainder of said mixture consisting of at least one heterocyclic compound containing a nitrogen heterocyclic atom located between two carbon atoms, said mixture being substantially free of film-forming components.

5. An electrolyte for use in electrolytic capacitors as defined in claim 4 wherein said mixture is liquid.

6. An electrolyte for use in electrolytic capacitors as defined in claim 4, said remainder of said mixture consists of a polymer of at least one heterocyclic compound containing a nitrogen heterocyclic atom located between two carbon atoms.

7. A liquid electrolyte for use in electrolytic capacitors consisting essentially of a substantially non-gas forming mixture under operating conditions, said mixture containing from about 10 to about 96 mole percent glacial acetic acid and from about 90 to about 4 mole percent pyridine, said mixture being substantially free of film-forming components.

8. A liquid electrolyte for use in electrolytic capacitors consisting essentially of a substantially non-gas forming mixture under operating conditions, said mixture containing about 21.6 mole percent pyridine and 78.4 mole percent glacial acetic acid, said mixture being substantially free of film-forming components.

9. An electrolyte for use in electrolytic capacitors consisting essentially of a substantially non-gas forming mixture under operating conditions of polymerized vinyl pyridine and acetic anhydride, said mixture being substantially free of film-forming components.

10. In an electrolytic capacitor having a tantalum anode coated with an adherent oxide layer and a cathode spaced from said anode, the improvement which comprises: an electrolyte consisting essentially of a substantially non-gas forming mixture under operating conditions of a heterocyclic compound containing a nitrogen heterocyclic atom located between two carbon atoms and a compound selected from a group consisting of aliphatic acids, alphahalogen substituted aliphatic acids and anhydrides thereof, said electrolyte electrically connecting said anode and said cathode, said mixture being substantially free of film-forming components.

11. In an electrolytic capacitor having a tantalum anode coated with an adherent oxide layer and a cathode spaced from said anode, the improvement which comprises: a substantially non-gas forming mixture under operating conditions consisting essentially of from about 10 to about 96 mole percent of at least one acidic compound selected from the group consisting of aliphatic acids, alpha-halogen substituted aliphatic acids, and anhydrides thereof, the remainder of said mixture consisting of at least one heterocyclic compound containing a nitrogen heterocyclic atom located between two carbon atoms, said mixture being substantially free of film-forming components.

12. In an electrolytic capacitor having a tantalum anode coated with an adherent oxide layer a and cathode spaced from said anode, the improvement which comprises: an electrolyte consisting essentially of from about 10 to about 96 mole percent glacial acetic acid and from about 90 to about 4 mole percent pyridine.

13. In an electrolytic capacitor having a tantalum anode coated with an adherent oxide layer and a cathode spaced from said anode, the improvement which comprises: an electrolyte consisting essentially of a substantially non-gas forming mixture under operating conditions of about 21.6 mole percent pyridine and 78.4 mole percent glacial acetic acid, said mixture being substantially free of film-forming components.

References Cited by the Examiner
UNITED STATES PATENTS

| | | | |
|---|---|---|---|
| 2,089,683 | 8/1937 | Clark | 317—230 |
| 2,104,733 | 1/1938 | Brennan | 317—230 |
| 2,155,086 | 4/1939 | Georgiev | 317—230 |
| 2,299,228 | 10/1942 | Gray et al. | 317—230 |
| 3,098,182 | 7/1963 | Burnham | 317—230 |

JOHN W. HUCKERT, *Primary Examiner.*

DAVID J. GALVIN, *Examiner.*

J. D. KALLAM, *Assistant Examiner.*